United States Patent [19]

Bingham et al.

[11] 4,263,673
[45] Apr. 21, 1981

[54] RECEIVE BUFFER FOR CONVERTING SYNCHRONOUS-TO-ASYNCHRONOUS DATA

[75] Inventors: John A. C. Bingham, Palo Alto; Xuong K. Dang, Sunnyvale, both of Calif.

[73] Assignee: Racal-Vadic, Inc., Sunnyvale, Calif.

[21] Appl. No.: 10,374

[22] Filed: Feb. 8, 1979

[51] Int. Cl.³ ............................................. H04L 7/00
[52] U.S. Cl. .................................... 375/117; 375/106; 375/112
[58] Field of Search ............... 375/106, 109, 110, 112, 375/117

[56] References Cited

U.S. PATENT DOCUMENTS

| | | | |
|---|---|---|---|
| 3,873,773 | 3/1975 | Guy, Jr. | 375/112 |
| 3,909,526 | 9/1975 | Fretwell | 375/112 |
| 3,937,882 | 2/1976 | Bingham | 375/109 |
| 3,961,138 | 6/1976 | Fellinger | 375/117 |
| 4,048,440 | 9/1977 | Peck | 375/117 |

Primary Examiner—Robert L. Griffin
Assistant Examiner—Michael A. Masinick
Attorney, Agent, or Firm—Harvey G. Lowhurst

[57] ABSTRACT

In a data transmission system, in which asynchronous-to-synchronous data conversion at the transmitter end of a data link at times removes stop bits from, and at other times adds stop bits, to a character, a receive buffer at the receive end of the data link which converts the synchronous data to asynchronous data. The receive buffer investigates the end of each character for missing stop bits and reinserts a stop bit where it finds a lack of one, and adds other stop bits to speed up the data rate from the nominal synchronous data bit transmission rate to the nominal asynchronous data bit output rate. The inserted stop bits are of a constant bit width which is the same as the character identification bit width, and the entire asynchronous data output stream has a constant bit rate.

16 Claims, 4 Drawing Figures

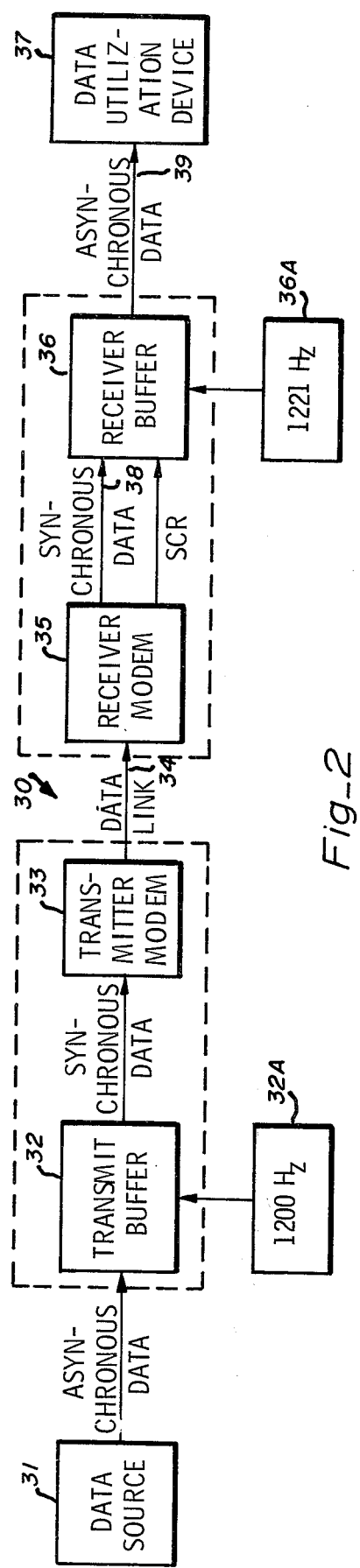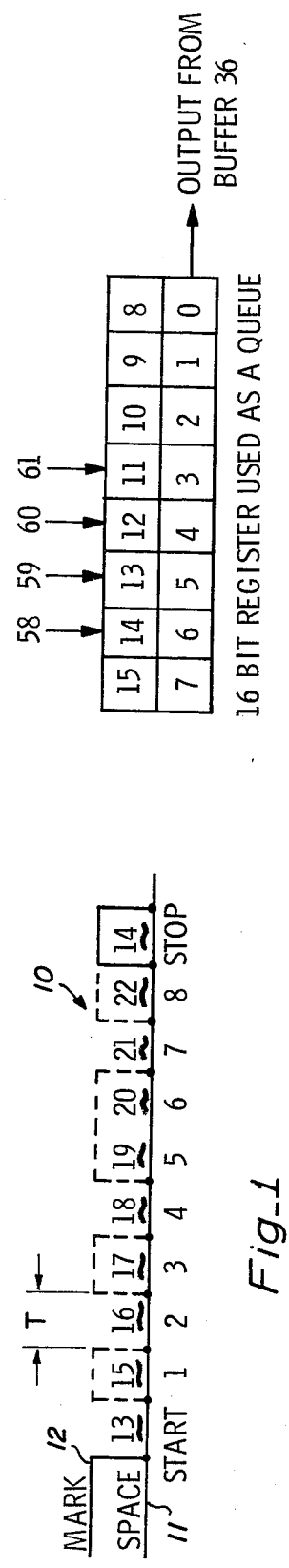

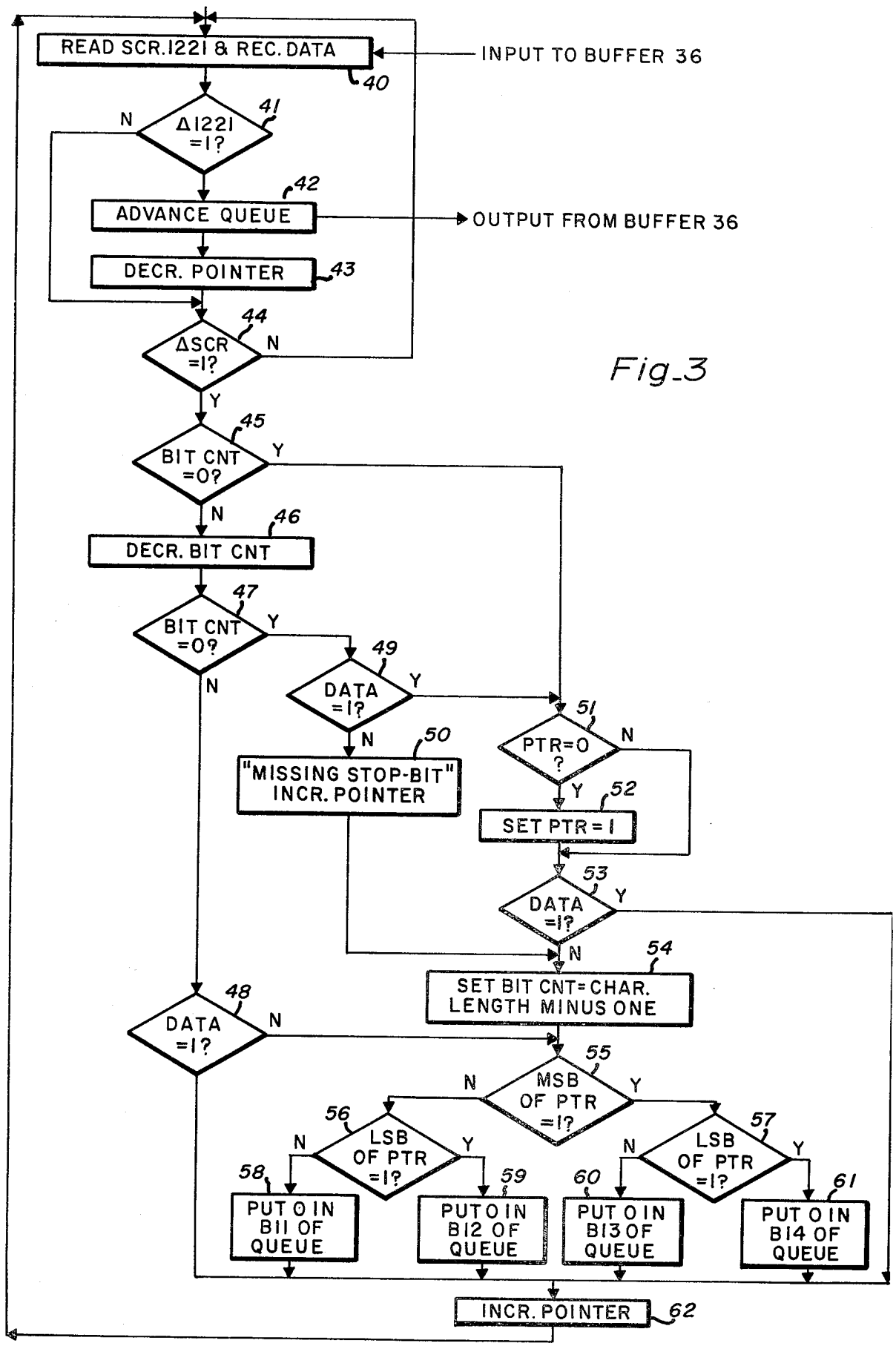
Fig_3

RECEIVE BUFFER FOR CONVERTING SYNCHRONOUS-TO-ASYNCHRONOUS DATA

BACKGROUND OF THE INVENTION

This invention relates to data transmission systems and, more particularly, to the reconstruction of asynchronous data characters from a received synchronous data stream.

Serial digital characters for transmission are usually generated in an asynchronous manner and may then be converted to a synchronous data stream for transmission over a data link to a distant terminal. A character may comprise a certain number of bits for identification and is usually started by a start bit and ended by a stop bit. These start and stop bits also separate characters from one another. By way of example, the American Standard Code for Information Interchange (ASCII) code utilizes ten bits which include a start bit, eight character identification bits (including a parity bit) and a stop bit. The Extended Binary Coded Decimal Interchange (EBCDIC) code utilizes nine bits which include a start bit, seven character identification bits and a stop bit.

Since these characters are usually generated in an asynchronous manner, which means that the bit period (width of time bit interval) may vary slightly between certain limits, and since such slight variations in the bit periods are unacceptable for transmitting such characters in a serial manner (data stream) over a synchronous data link, the data stream must be synchronised. Accordingly, a complete data transmission system for transmitting asynchronous data normally includes, a character generation device at a transmit terminal which generates asynchronous data, a transmit buffer for converting the asynchronous data to synchronous data, a transmit modem for converting synchronous data streams from digital to analog signals, a data link, a receive modem which converts the synchronous data stream back from analog to digital signals, a receive buffer which converts, when necessary, the synchronous data back into asynchronous data, and finally a receive terminal to which the asynchronous data are applied. The term asynchronous data, as used herein, refers to a character which has a start bit, a certain number of data bits which uniquely identify the character, and at least one stop bit.

A common problem in converting asynchronous data to synchronous data for transmission over a data link, and then back to asynchronous data after transmission, is that the asynchronous data to be transmitted have a bit rate which is at times faster and at other times slower than the nominal synchronous data transmission rate. One method in use today to slow down the asynchronous data is the removal of the stop bit at the end of the character in the transmit buffer, necessitating its subsequent restoral in the receive buffer. One system which removes stop bits with a transmit buffer and inserts the missing stop bit with the receive buffer is disclosed in U.S. Pat. No. 4,048,440 and is used in the well-known Bell 212 Modem. The bell 212 Modem, as described in the patent, converts the asynchronous data into synchronous data, sends the data over the data channel at a nominal and constant bit rate of 1200 bits per second, and reconverts the synchronous data stream to asynchronous data by reinserting the missing stop bits where necessary. To accomplish this, the receive buffer outputs all bits except the stop bits at a rate of 1219 bps and maintains character synchronization by varying the length of the stop bits. The length depends upon the number of bits in each character and whether it has been necessary to reinsert a missing stop bit. More particularly, for nine or ten bit characters, stop bit lengths of 820, 898, 924, or 951 microseconds may be used. The receive buffer to accomplish this is most complex and therefore costly to manufacture and to test.

Another method of data transmission, which avoids the use of reinserting stop bits, is described in U.S. Pat. No. 3,937,882 and is used in the Vadic VA3400 Modem. In that modem, the asynchronous data are converted to synchronous data which have a nominal transmission rate which is higher than the highest nominal asynchronous data frequency, such as for example 1205 bits per second or higher. In this manner, it is unnecessary to convert the receive data back into asynchronous data because each character has a start bit and at least one stop bit, and the normal receiver terminal is well able to recognize and differentiate between redundant stop bits, resulting in the elimination of the receive buffer. Even though this transmission system is considered much simpler than the one described in U.S. Pat. No. 4,048,440, it is often desirable to be able to "talk" to a Bell 212 Model which is not possible with the transmission system described in U.S. Pat. No. 3,937,882.

It is therefore a primary object of the present invention to provide a receive buffer capable of converting synchronous data with missing stop bits to asynchronous data which is simple, reliable and economical.

It is a further object of the present invention to provide a receive buffer which accepts synchronous data with missing stop bits at a first nominal bit rate and which outputs these data at a second nominal bit rate which is always higher than the first bit rate and in which not only the intracharacter bit rate is constant, but the entire data stream has a constant bit rate.

It is another object of the present invention to provide a receive buffer for converting synchronous data with missing stop bits to asynchronous data, by adding stop bits having the same width as the character bits.

It is still a further object of the present invention to provide a transmission system having a receive buffer which reinserts missing stop bits of normal character bit widths, and which provides an asynchronous data stream having a bit rate which is not only constant within the character but also between characters and which is higher than the synchronous bit rate.

SUMMARY OF THE PRESENT INVENTION

The receive buffer of the present invention accomplishes these objectives by investigating each character for a missing stop bit and by reinserting a stop bit where a missing stop bit is detected. Further, the receive buffer outputs an asynchronous stream of data at a nominal rate which is higher than the synchronous transmission bit rate so that the character rate of the data stream requires slowing down. It accomplishes this not only by inserting standard width stop bits where it finds a missing one, but by inserting redundant standard width stop bits as necessary to slow down the character rate of the data stream, whilst maintaining the higher (1221 bps) intracharacter rate.

The control means in the receive buffer is responsive to incoming synchronous data streams and a receiver clock and includes a reverse counter set to a number which is selected in accordance with the character code and which counts backwards. The counter will detect the missing stop bit, if there be one missing, and initiate a program routine to place a standard stop bit at the end of the character. The control means also determines whenever the start of a bit is sensed and outputs such a bit using the receiver data output rate which is higher than the synchronous transmission rate.

BRIEF DESCRIPTION OF THE DRAWINGS

FIG. 1 is a diagrammatic representation of an asynchronous character utilizing the data format of the ASCII code;

FIG. 2 is a schematic block diagram showing a complete transmission system, including the receive buffer of the present invention.

FIG. 3 comprises a high level flow chart specifying the operating sequences of the receive buffer of the present invention;

FIG. 4 is a diagrammatic representation of the queue in the form of a sixteen bit register used in conjunction with the flow chart of FIG. 3.

DETAILED DESCRIPTION OF THE EMBODIMENT

Referring initially to FIG. 1 of the drawing, there is shown a diagrammatic representation of an ASCII coded character 10 between a space bar 11 and a mark bar 12, which respectively designates the low or zero level, and the high or one level. Character 10 comprises a start bit 13 at the beginning of the character which is low, a stop bit at the end of the character which is high, and a plurality of data bits such as the eight bits 15-22 which identify the character (including a parity bit). The width of each bit, such as 16, is identified by the letter T to designate time.

As has been explained heretofore, when asynchronous characters such as character 10 are applied to a transmit buffer at a bit rate which is greater than the nominal data link transmit bit rate the data must be slowed down to the transmission bit rate which is accomplished in the transmission system of the present invention, by removing stop bits, such as stop bit 14 from character 10. As has also been explained, the receive terminal of the data transmission system, such as a computer or some other utilization devices, requires a character to start off with a start bit, such as start bit 13, and end with at least one stop bit, such as bit 14, or it cannot be recognized. A receive terminal, however, is always able to tolerate redundant stop bits so that placing more than one stop at the end of a character to increase the receive buffer output rate to a constant rate in excess of the transmission rate will not interfere with the recognition of the asynchronous data by the terminal.

FIG. 2 shows a complete data communication system 30 which comprises a data source 31 which may be in the form of a scanning device, a CRT, or a Teletypewriter and which provides asynchronous data. These data are applied to a transmit buffer 32 for conversion to synchronous data which, at times, have characters with a missing or with multiple stop bits. There is also shown a block 32A which represents the transmitter clock (SCT) which has an output frequency of 1200 Hz which is the nominal transmitted bit rate. The synchronous data is applied, via a transmit modem 33 to a data link 34 for reception by a receive modem 35. It should be understood that block 32 normally forms part of the transmitter modem but is shown separately to emphasize the invention which relates to the counterpart of the receiver modem. The synchronous data in digital form from the receive modem are applied to a receive buffer 36 which reconverts the synchronous data to asynchronous data for application to a data utilization device 37 which may be a computer, a memory storage or the like. Again, normally block 36 is a part of the receiver modem, but is separately shown for more clarity. It should also be noted that modem 35 develops the bit rate clock, also known as the Serial Clock Receiver of 1200 Hz and applies this clock signal to buffer 36 together with a receiver output clock 36A which controls the bit rate of asynchronous data stream 39.

The present invention relates to the means and method by which receive buffer 36 converts the synchronous data which occasionally have missing stop bits to asynchronous data. For the purpose of the ensuing explanation of the present invention, we will assume an input data rate to the transmitter which is slightly in excess of 1200 bps, a nominal synchronous transmission bit rate of 1200 bps over data link 34, and a nominal asynchronous received data bit rate of 1221 bps. This will require the deletion of at least some stop bits during the transmitter conversion from asynchronous to synchronous data and the subsequent reinsertion of these stop bits, together with the addition of redundant stop bits, to increase the rate to 1221 bps. For the purpose of explaining the construction and operation of receive buffer 36, an ASCII character format has been chosen which has at least a start bit, a stop bit and eight character bits. It should be understood, however, that receive buffer 36 can readily be modified to convert any other character format from synchronous to asynchronous and provide the asynchronous data at any other output rate providing the rate is greater than the transmission rate so that full width stop bits can be reinserted.

The preferred means of implementing the receive buffer 36 is a microprocessor such as an Intel MCS-48, but it could also be implemented by specialized digital logic circuitry employing conventional shift-registers, up-down counters and individual, multiple-input gates. The basic principles of operation of the buffer are illustrated in FIG. 3 by means of a flow-chart for a microprocessor program, but the conversion to a set of design rules for specialized digital circuitry will be apparent to one skilled in the art. For examples, the instruction "advance queue" in box 42 would transform into "move the contents of a shift-register one place to the right", and the instruction "put O in B11 of queue" in box 58 would transform into "reset the twelfth flip-flop of the shift-register to zero".

The program loop as shown in FIG. 3 may be expanded to include some of the other operations which must be performed in the modem by continuing the program after the instruction "increment pointer" in box 62 before returning to box 40. These other operations will not affect the operation of the buffer provided only that the time required to perform all the operations in the loop is less than one period of the Serial Clock Receive; therefore these other operations will not be considered here.

The basic principle of operation of the receive buffer 36 is as follows. Each bit of data is read into the buffer at a rate which is controlled by a synchronous clock (SCR) supplied by the receiver and placed in a calculated position in a queue; this position is indicated by a pointer whose value changes as data and stop bits are read into and passed out from the buffer. Data is outputted from the buffer and the queue is advanced at the 1221 bps rate. Unless loaded otherwise by the incoming data being spaces (zeros), the queue is kept full of marks (ones) and the insertion of a stop bit is accomplished by incrementing the pointer and thereby relegating subsequent incoming data bits to a position one further back in the queue.

FIG. 4 shows a suitable queue register 70 having 16 bits which are labeled from 0 to 15. The bit size of queue 70 is not important except that it must have at least a bit size equal to the range of the pointer (a two bit register), which is four in this case. The remainder of the queue allows storage of at least one complete character which is useful for signalling and detecting the end of a transmission. In the illustrated queue, bits numbered 0 to 10 are asynchronous data which are outputted at the rate of 1221 bits per second and lines labeled 58, 59, 60 and 61 are parallel inputs where the data stream is put together as will now be explained. Bit number 15 is not used.

The operational flow-chart for the loop synchronization and data input and output routines, which is shown in FIG. 3, will now be described box by box.

In box 40 the microprocessor reads the states of the Serial Clock Receive (nominally at 1200 Hz) and Receive Data signals which come from the modem and the Output Clock (at 1221 Hz in one particular embodiment) which comes from the clock generating circuit, 36A; these signals may be generated elsewhere in the program or may be input to the micro-processor through input ports. Box 41 then tests the 1221 clock; if there has been a transition from a zero to a one since the last sample, box 42 outputs one bit and advances the queue and box 43 decrements the queue pointer (thereby indicating that the tail of the queue has advanced one position); if there has been no such transition in the 1221 clock, the program proceeds to box 44.

Box 44 then tests the SCR. If there has been no transition from zero to one since the last sample, this means that there is not yet another bit of data available from the receiver and the program returns to box 40 and resamples. If there has been such a transition, this means there is a bit available and the program proceeds to the data input routine (beginning with box 45) which places the available bit in the appropriate position in the queue.

Box 45 checks whether the bit count is zero—that is, whether a complete character has been received; if it is, the program is ready for a new character to begin and proceeds to box 51 to test the pointer; if it is not, box 46 decrements the bit counter by one and box 47 tests it again. If the bit count is still not zero, this means that the bit which is to be read in is not a stop bit. Box 48 then tests whether this bit is a mark (one) or space (zero); if it is a mark no action is necessary because the queue is already full of marks; if it is a space the program goes to box 55 to decide where in the queue to insert the space.

If the bit count in box 47 was zero, this means that the bit being received should be a stop bit. Box 49 tests whether it is a mark; if it is, this means that it is indeed a first stop bit and the program proceeds as before upon completion of a character, that is, to box 51. If box 49 found a space, this means that a stop bit has been deleted by the transmitter and this space is the start bit of the next character. Box 50 increments the queue pointer—thereby letting another mark through in the queue and effectively inserting a stop bit.

Before continuing to box 54, this description must go back to box 51. A complete character has been received and extra stop bits can now be inserted if necessary—that is if the higher (1221) output rate has depleted the queue too much. Box 51 tests the pointer; if it is equal to zero, Box 52 increments it to one—this has the effect of inserting a stop bit.

Box 53 tests the input data bit; if it is a mark this means that it is an intercharacter bit and, ignoring box 54, the program proceeds to box 55. If the data bit is a space, this means that it is the start bit of a new character. The other path to box 54 (from box 50) also meant that the input bit is a start bit so box 54 prepares for a new character by resetting the bit counter to one less than the (predefined) number of bits in a character, that is to nine with the present example of ten bit ASCII characters.

Boxes 55, 56 and 57 test the pointer (a two bit binary number) to decide where to put the input space. Box 55 tests the more significant bit. If it is zero (meaning the pointer is either zero or one), the program goes to box 56. If it is one, the program goes to box 57. Similar tests on the less significant bit lead to boxes 58, 59, 60 or 61 which put a zero in positions B11, B12, B13, or B14 of the queue if the value of the pointer is zero, one, two or three respectively.

Finally, box 62 increments the pointer by one to indicate that a bit has been stored and the program returns to box 40 to wait for a new input bit or a new output clock change.

A computer print out of the instructions of a microprogram which implements the flow-chart of FIG. 3, is reproduced below. This program is written for the Intel MCS-48 family of microprocessors but it will be apparent to those skilled in the art now to modify it for any other microprocessor, controller or computer:

```
  LOC  OBJ        SEQ       SOURCE STATEMENT

1                  ; THE FOLLOWING SECTION IS THE RECEIVER BUFFER
                   1                  ; IT ACCEPTS 3 INPUTS-THE RECEIVED DATA, SCR  ...
  0000  15         2  SCAN1:   SEL    RB1
  0001  0A         3           IN     A, P2    ; READ INTO BUFFER THE RECE...
  0002  53F0       4           ANL    A, #0F0H
  0004  2E         5           XCH    A, R6
  0005  DE         6           XRL    A, R6
  0006  B20C       7           JF5    ADV01
  0008  921C       8  SCAN2:   JB4    DEBUFF
  000A  0400       9           JMP    SCAN1
  000C  2E        10  ADV01:   XCH    A, R6
  000D  67        11           RRC    A
  000E  2E        12           XCH    A, R6
  000F  77        13           RR     A
  0010  F7        14           RLC    A
```

| LOC  | OBJ  | SEQ | | SOURCE STATEMENT | | |
|------|------|-----|--|------|------|------|
| 0011 | 3E   | 15  |         | MOVD | P6,A | |
| 0012 | 2D   | 16  |         | XCH  | A,R5 | |
| 0013 | 97   | 17  |         | CLR  | C    | |
| 0014 | A7   | 18  |         | CPL  | C    | |
| 0015 | 67   | 19  |         | RRC  | A    | |
| 0016 | 2D   | 20  |         | XCH  | A,R5 | |
| 0017 | 2E   | 21  |         | XCH  | A,R6 | |
| 0018 | E7   | 22  |         | RL   | A    | |
| 0019 | 67   | 23  |         | RRC  | A    | |
| 001A | 2E   | 24  |         | XCH  | A,R6 | |
| 001B | CF   | 25  |         | DEC  | R7   | |
| 001C | 0400 | 26  |         | JMP  | SCAN1 | |
| 001E | FC   | 27  | DEBUFF: | MOV  | A,R4 | |
| 001F | C637 | 28  |         | JZ   | START | |
| 0021 | 07   | 29  |         | DEC  | A    | |
| 0022 | AC   | 30  |         | MOV  | R4,A | |
| 0023 | 9643 | 31  |         | JNZ  | TCARRY | |
| 0025 | F637 | 32  |         | JC   | START | |
| 0027 | FA   | 33  |         | MOV  | A,R2 | |
| 0028 | 122F | 34  |         | JB0  | BREAK | |
| 002A | BA01 | 35  |         | MOV  | R2,#001H | ;SET BF=1,MISSING STOP B |
| 002C | 1F   | 36  |         | INC  | R7   | |
| 002D | 0447 | 37  |         | JMP  | SETBCT | |
| 002F | FE   | 38  | BREAK:  | MOV  | A,R6 | |
| 0030 | 963F | 39  |         | JNZ  | BF0  | |
| 0032 | 27   | 40  |         | CLR  | A    | |
| 0033 | AD   | 41  |         | MOV  | R5,A | |
| 0034 | AE   | 42  |         | MOV  | R6,A | |
| 0035 | 0466 | 43  |         | JMP  | INCPTR | |
| 0037 | FF   | 44  | START:  | MOV  | A,R7 | |
| 0038 | 323C | 45  |         | JB1  | MCARRY | |
| 003A | BF01 | 46  |         | MOV  | R7,#001H | |
| 003C | A7   | 47  | MCARRY: | CPL  | C    | |
| 003D | F647 | 48  |         | JC   | SETBCT | |
| 003F | BA00 | 49  | BF0:    | MOV  | R2,#000H | |
| 0041 | 0466 | 50  |         | JMP  | INCPTR | |
| 0043 | F666 | 51  | TCARRY: | JC   | INCPTR | |
| 0045 | 044C | 52  |         | JMP  | SCARRY | |
| 0047 | B82F | 53  | SETBCT: | MOV  | R0,#02FH | ;BCT=CHAR. LENGTH |
| 0049 | F0   | 54  |         | MOV  | A,@R0 | |
| 004A | 07   | 55  |         | DEC  | A    | |
| 004B | AC   | 56  |         | MOV  | R4,A | |
| 004C | FF   | 57  | SCARRY: | MOV  | A,R7 | |
| 004D | C650 | 58  |         | JZ   | PTRE00 | |
| 004F | 1256 | 59  |         | JB0  | PTR3 | ;PTR=1 OR 3 |
| 0051 | FD   | 60  |         | MOV  | A,R5 | |
| 0052 | 53DF | 61  |         | ANL  | A,#11011111B | ;PTR=2 |
| 0054 | 0465 | 62  |         | JMP  | RESTR0 | |
| 0056 | 3262 | 63  | PTR3:   | JB1  | PTRE03 | |
| 0058 | FD   | 64  | PTRE01: | MOV  | A,R5 | |
| 0059 | 53EF | 65  |         | ANL  | A,#11101111B | ;PUT 0 IN B12 |
| 005B | 0465 | 66  |         | JMP  | RESTR0 | |
| 005D | FD   | 67  | PTRE00: | MOV  | A,R5 | |
| 005E | 53F7 | 68  |         | ANL  | A,#11110111B | ;PUT 0 IN B11 |
| 0060 | 0465 | 69  |         | JMP  | RESTR0 | |
| 0062 | FD   | 70  | PTRE03: | MOV  | A,R5 | |
| 0063 | 53BF | 71  |         | ANL  | A,#10111111B | ;PUT 0 IN B14 |
| 0065 | AD   | 72  | RESTR0: | MOV  | R5,A | |
| 0066 | 1F   | 73  | INCPTR: | INC  | R7   | |
| 0067 | 0400 | 74  |         | JMP  | SCAN1 | |
|      |      | 75  |         | END  |      | |

USER SYMBOLS

| ADV01 | 000C | BF0 | 003F | BREAK | 002F | DEBUFF | 001E | INCPTR | 0066 | MCARRY | 003C |
|-------|------|-----|------|-------|------|--------|------|--------|------|--------|------|
| PTRE00 | 005D | PTRE01 | 0058 | PTRE03 | 0062 | RESTR0 | 0065 | SCAN1 | 0000 | SCARRY | 004C |
| SETBCT | 0047 | START | 0037 | TCARRY | 0043 | | | | | | |

ASSEMBLY COMPLETE, NO ERRORS

It will be apparent that the above detailed description of the present receive buffer for converting synchronous-to-asynchronous data can readily be modified to work with any character format and any receiver output frequency, provided such frequency is greater than the synchronous data transmission frequency. For example, by changing bit counter 47 to a different number, a different length character can be detected. Likewise, by applying a different receiver output clock, a different asynchronous data output rate is obtained.

We claim:

1. In a digital data transmission system, including a transmit buffer for converting asynchronous data at an inprecise rate to synchronous data at a constant transmit bit rate adding or removing stop bits, a synchronous data transmission system, and a receive buffer for converting the synchronous to asynchronous data for use at a terminal in which each character has a start bit, a plurality of character identification bits and at least one stop bit, the improvement in a receive buffer comprising:

means for examining the stream of incoming synchronous data bits and for detecting the absence of a stop bit at the end of a character; and means for adding a stop bit, having the same width as a character identification bit, at the end of each such detected character.

2. In a digital data transmission system in accordance with claim 1 in which the receive buffer further includes means for outputting all asynchronous data as a constant receiver output bit rate which is higher than said transmit bit rate.

3. In a digital data transmission system in accordance with claim 2 in which the receive buffer further includes queue means for generating said asynchronous data, said queue means having a plurality of parallel input lines and a single series output line.

4. In a digital data transmission system in accordance with claim 2 in which said receive buffer further includes a queue means in which the asynchronous data are formed, clock means for advancing said queue means serially to output said asynchronous data at the receiver output bit rate, and input means responsive to transmit bit rate and said incoming synchronous data and operative to access a plurality of adjacent positions in said queue means in parallel.

5. In a digital data transmission system in accordance with claim 4 in which said input means further includes a pointer means which selects into which position of said queue means data are inserted.

6. In a digital data transmission system in accordance with claim 5 in which said pointer means is decremented by said clock means and is incremented each time a received data bit is placed into the queue and each time a stop bit is generated by said receive buffer and placed into said queue.

7. In a digital data transmission system in accordance with claim 2 which further includes a queue means in which said asynchronous data are formed, said queue means having a plurality of adjacent positions, and pointer means for selecting into which position of said queue means data are to be inserted, said pointer means being responsive to the placing of data bits and stop bits into said queue means and to the advancing of the data in the queue means.

8. The method for converting synchronous data to asynchronous data, in which each character has a start bit, a plurality of character identification bits, and at least one stop bit, in a digital data transmission system in which asynchronous data from a data generating means are converted to synchronous data for transmission over a data link at a selected transmit bit rate by adding and removing stop bits to respectively slow down or speed up the asynchronous data to the transmit bit rate, the method comprising the steps of:

examining the end of each received character for a missing stop bit, and adding at least one stop at the end of each character which has been found to have a missing stop bit, the stop being added having invariably the same width as a character identification bit.

9. The method of converting synchronous data to asynchronous data in accordance with claim 8 which includes the step of outputting the asynchronous data at a constant intracharacter bit rate and a constant intercharacter bit rate.

10. The method of converting synchronous data to asynchronous data in accordance with claim 9 in which the intracharacter bit rate and the intercharacter bit rate are equal to one another.

11. The method of converting synchronous data to asynchronous data in accordance with claim 10 in which the asynchronous bit rate is higher than the transmit bit rate.

12. The method of converting synchronous data to asynchronous data in accordance with claim 11 in which extra stop bits are added to speed up the bit rate from the transmit bit rate to the asynchronous bit rate, the stop bits being added having invariably the same width as a character identification bit.

13. The method of converting synchronous data to asynchronous data in accordance with claim 8 in which the asynchronous data are formed in parallel and are outputted in series at the asynchronous data bit rate.

14. The method of converting synchronous data to asynchronous data in accordance with claim 8 in which the asynchronous data are formed by placing a start bit, character identification bits and at least one stop bit into predetermined position into an output queue, and outputting the contents of the output queue serially at the asynchronous data bit rate.

15. The method of converting synchronous data to asynchronous data in accordance with claim 14 in which each received data bit is inserted into a selected one of a plurality of adjacent positions in the output queue.

16. The method of converting synchronous data to asynchronous data in accordance with claim 15 in which the selection of the position into which data are placed is made by a pointer which is decremented by each advance of the output queue and is incremented by each received data bit and each stop bit inserted where a missing stop bit is found, and which adds further a stop bit each time the counter is decremented to zero to thereby again increment the counter.

* * * * *